United States Patent
Anderson

(10) Patent No.: US 8,217,251 B2
(45) Date of Patent: Jul. 10, 2012

(54) INTERACTIVE DISPLAY

(76) Inventor: Lawrence E Anderson, Arlington, VA (US)

(*) Notice: Subject to any disclaimer, the term of this patent is extended or adjusted under 35 U.S.C. 154(b) by 123 days.

(21) Appl. No.: 12/586,800

(22) Filed: Sep. 28, 2009

(65) Prior Publication Data

US 2011/0072954 A1 Mar. 31, 2011

(51) Int. Cl.
*G10H 1/00* (2006.01)
*G06F 17/00* (2006.01)
*H03G 3/20* (2006.01)
*G10L 21/00* (2006.01)

(52) U.S. Cl. ............ 84/601; 700/94; 381/110; 704/275; 715/203

(58) Field of Classification Search .............. 434/307 A, 434/307 R; 353/28; 84/600–604, 610; 700/94; 381/110; 704/270, 272, 275, 246–257; 715/202, 715/203
See application file for complete search history.

(56) References Cited

U.S. PATENT DOCUMENTS

| | | | |
|---|---|---|---|
| 5,499,921 A * | 3/1996 | Sone ......................... | 434/307 A |
| 5,609,487 A * | 3/1997 | Setlabudi et al. ......... | 434/307 A |
| 5,706,334 A | 1/1998 | Balk et al. | |
| 5,724,412 A | 3/1998 | Srinivasan | |
| 5,728,960 A * | 3/1998 | Sitrick ....................... | 84/477 R |
| 5,870,454 A | 2/1999 | Dahlen | |
| 5,876,213 A * | 3/1999 | Matsumoto ............... | 434/307 A |
| 5,894,504 A | 4/1999 | Alfred et al. | |
| 5,943,398 A | 8/1999 | Klien et al. | |
| 5,945,989 A | 8/1999 | Freishtat et al. | |
| 5,996,006 A | 11/1999 | Speicher | |
| 6,053,740 A * | 4/2000 | Nakata et al. ............. | 434/307 A |
| 6,058,435 A | 5/2000 | Sassin et al. | |
| 6,072,862 A | 6/2000 | Srinivasan | |
| 6,084,168 A * | 7/2000 | Sitrick ....................... | 84/477 R |
| 6,166,314 A * | 12/2000 | Weinstock et al. ......... | 84/483.1 |
| 6,189,018 B1 | 2/2001 | Newman et al. | |
| 6,219,638 B1 | 4/2001 | Padmanabhan et al. | |
| 6,282,275 B1 | 8/2001 | Gurbani et al. | |
| 6,290,359 B1 * | 9/2001 | Shriver ....................... | 353/28 |
| 6,385,306 B1 | 5/2002 | Baxter, Jr. | |
| 6,442,242 B1 | 8/2002 | McAllister et al. | |
| 6,466,940 B1 | 10/2002 | Mills | |
| 6,507,643 B1 | 1/2003 | Groner | |
| 6,529,584 B1 | 3/2003 | Ravago et al. | |

(Continued)

OTHER PUBLICATIONS

Autoscript Voice-Plus+. Jun. 2, 2008. http://replay.waybackmachine.org/20080602105812/www.autoscript.tv/product-Voice-Plus-1027.*

*Primary Examiner* — Elvin G Enad
*Assistant Examiner* — Andrew R Millikin

(57) ABSTRACT

An interactive assembly for displaying a sequence of words from a text comprising: a processor; at least one memory operatively connected to the processor; at least one speech recognizer operatively connected to the processor; at least one audio input operatively connected the speech recognizer; at least one display operatively connected to the speech recognizer for displaying words of a song based upon the words recognized by the speech recognizer; whereby based upon a word received by the audio input, the next words to be recited incrementally displayed onto the at least one display contemporaneously with the input received from the operator. A method for interactively display the words of a text sequentially on a display comprising: receiving an inputted vocal input in an audio input device; inputting the inputted vocal input into a speech recognizer; comparing the inputted vocal input with words stored in sequence in memory; outputting on a display screen only the next sequential words for display.

22 Claims, 10 Drawing Sheets

U.S. PATENT DOCUMENTS

| | | |
|---|---|---|
| 6,563,912 B1 | 5/2003 | Dorfman et al. |
| 7,157,638 B1 * | 1/2007 | Sitrick .................. 84/477 R |
| 7,164,076 B2 * | 1/2007 | McHale et al. ............ 84/616 |
| 7,423,213 B2 * | 9/2008 | Sitrick .................. 84/477 R |
| 7,612,278 B2 * | 11/2009 | Sitrick et al. ............. 84/609 |
| 7,672,845 B2 * | 3/2010 | Beranek et al. ........... 704/251 |
| 7,806,759 B2 * | 10/2010 | McHale et al. ............ 463/7 |
| 2002/0147589 A1 * | 10/2002 | Itaki ..................... 704/260 |
| 2007/0119292 A1 * | 5/2007 | Nakamura ................ 84/610 |
| 2008/0026355 A1 * | 1/2008 | Petef ..................... 434/307 A |
| 2008/0113325 A1 * | 5/2008 | Mellqvist et al. .......... 434/307 A |
| 2008/0184870 A1 * | 8/2008 | Toivola ................... 84/610 |
| 2011/0043652 A1 * | 2/2011 | King et al. ............... 348/222.1 |

* cited by examiner

INTERACTIVE DISPLAY

FIELD OF THE INVENTION

The present invention is directed to displays and in particular to an interactive display system.

BACKGROUND OF THE INVENTION

Conventional displays of musical notes or words exist in which the song or words to be read is scrolled across a screen while the singer sings the words, the actor recites his lines or the musician plays the notes. However, should the singer or actor decide to pause or vary the song, the scrolling may be ineffective.

In U.S. Pat. No. 5,876,213, hereby incorporated by reference, there is disclosed a karaoke apparatus which is constructed to perform a karaoke accompaniment part and a karaoke harmony part for accompanying a lice vocal part. A pickup device collects the speech of the live vocal part. A detector device analyzes the collected singing voice to detect a musical register thereof at which the live vocal part is actually performed. A harmony generator device generates harmony voice of the karaoke harmony part according to the detected musical register so that the karaoke part is made consonant with the live vocal part. A tone generator device generates an instrumental tone of the karaoke accompaniment in parallel to the karaoke harmony.

SUMMARY OF THE PRESENT INVENTION

A preferred embodiment comprises a display assembly comprising a speech recognizer which recognizes the words of a song being sung or words being recited so as to control the display of the next words in the sequence of the song or performance. The display is intended to assist a singer during a performance, such as at a dance or concert, or may be used by an actor or actress during a play or the like.

Commonly, the singer has a repertoire of songs that the singer knows and can perform without assistance of reading from a screen. However, this requires a great deal of time and preparation.

By making the screen interactive, wherein the scrolling feature is controlled by the speech recognizer, only a few words need to be displayed at one time, namely, those currently being sung or recited. With the reduction of the number of words needed for the display, the words can be made large while at the same time; the device can remain concealed from the audience.

A preferred embodiment has the optional feature whereby the note can be held for an extended period of time and the scrolling feature will "hold" the location in the song. Optionally, the singer may decide to shorten the song or skip ahead. By changing the words being sung to those later in the song, the speech recognizer will recognize such words as being later in the song and automatically skip to that section of the song. For example, in the song of Jingle Bells, the singer may wish to skip to "bobsled ride" or may repeat a refrain. The display assembly will automatically skip to the proper segment of the song. In the case of an actor's performance, the recitation of an actor's lines may be effected by applause or delay of the play by another actor or actress who recites their lines at an alternate or various speeds.

A preferred embodiment includes a network of displays which is preferably controlled by the lead singer or central controller. The background musicians will have similar displays of the music at a particular location in the song for each musician. In a preferred embodiment, the display screens are networked so that each singer or musician has a display in which the next sequential part is displayed. In a preferred embodiment, the need for a stand which holds the music from which the musicians play may be unnecessary and the display prompter eliminates the need to turn the sheets of music. Moreover, it tends to synchronize the play of the respective musicians, since the display of music may be controlled by a lead singer's voice or a central control.

One feature of a preferred embodiment is that the singer can adjust the words of song being displayed as the words are incremented forward. The singer can adjust as needed to scroll ahead further; include more words, or repeat a refrain. Optionally, the singer may adjust the height of characters either by orally stating a word such as "Larger letters" or using a control, such as a remote control.

As the person sings or actor recites his lines, the spoken words from the singer/actor are inputted into the computer. The lyrics advance based upon the inputted information using speech recognition software.

Alternatively, when the singer announces the song, this could be inputted into the song selection device; whereupon the lyrics of the chosen song are displayed to automatically guide the actor/singer as to the words to be sung or recited.

The display 11 may be positioned on the floor at the foot of the singer. Or the display 11 may be combined with a microphone or, in the case of a piano or drum player, the display may be mounted to the instrument or music stand. The musical device 10 may either recognize the sounds of music and/or the lyrics and advance as the song is play or sung.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings. The drawings of this invention are illustrative and diagrammatic in nature in order to present the principles of the invention. They are being provided as examples without limiting the invention to the specific configuration or dimensions shown.

DETAILED DESCRIPTION OF PREFERRED EMBODIMENTS

Figure 1:
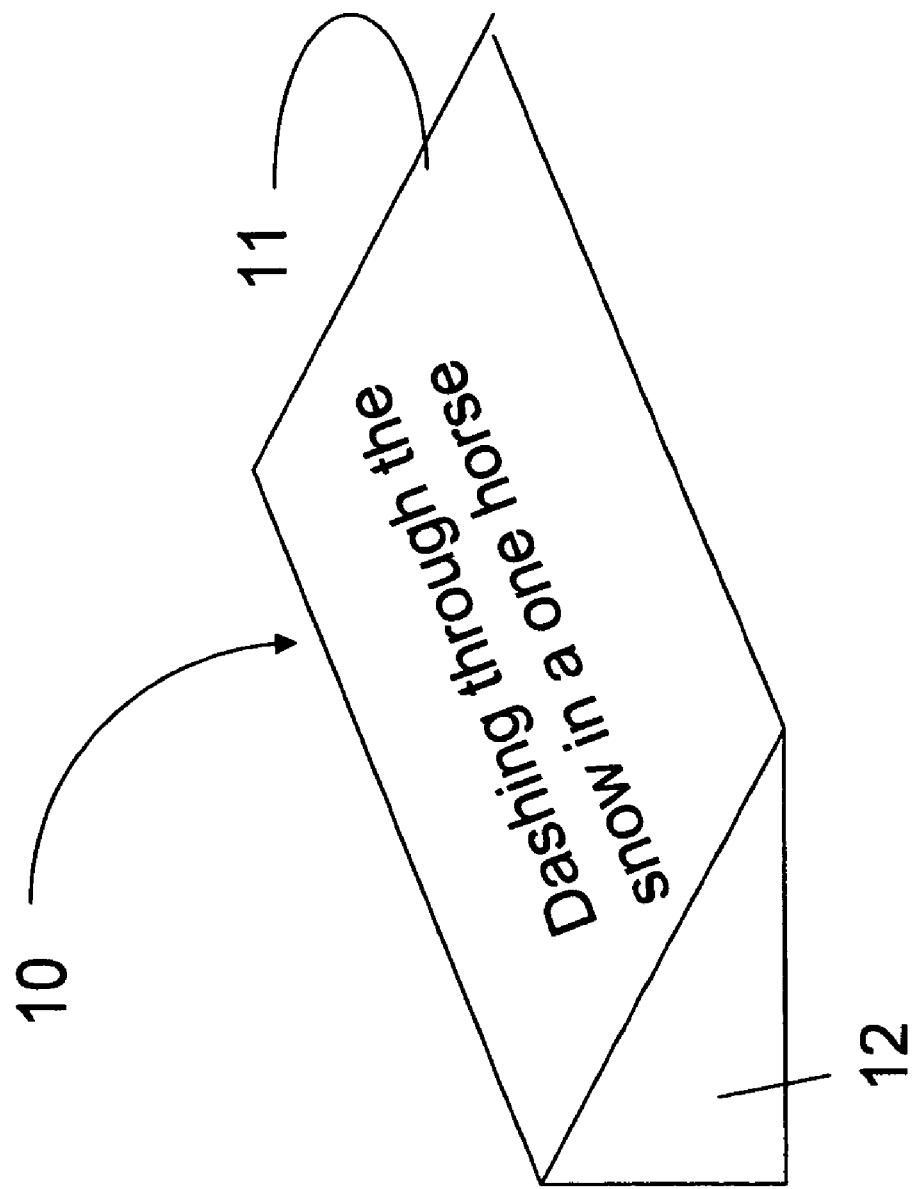
FIG. 1 is an illustration showing a preferred embodiment assembly 10 of the present invention comprising a display 11 and support 12.

The invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout the description of the figures.

It will be understood that when an element is referred to as being "on" another element, it can be directly on the other element or intervening elements may be present. In contrast, when an element is referred to as being "directly on" another element, there are no intervening elements present. It will be understood that when an element is referred to as being "connected" or "coupled" to another element, it can be directly connected or coupled to the other element or intervening elements may be present. In contrast, when an element is referred to as being "directly connected or coupled" to another element, there are no intervening elements present. Furthermore, "connected" or "coupled" as used herein may include wirelessly connected or coupled. As used herein, the term "and/or" includes any and all combinations of one or more of the associated listed items.

It will be understood that, although the terms first, second, etc. may be used herein to describe various elements, these elements should not be limited by these terms. These terms are only used to distinguish one element from another. For example, a first layer could be termed a second layer, and, similarly, a second layer could be termed a first layer without departing from the teachings of the disclosure.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to other elements as illustrated in the Figures. It will be understood that relative terms are intended to encompass different orientations of the device in addition to the orientation depicted in the Figures. For example, if the device in one of the figures were turned over, elements described as being on the "lower" side of other elements would then be oriented on "upper" sides of the other elements. The exemplary term "lower", can therefore, encompass both an orientation of "lower" and "upper," depending of the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

FIG. 1 illustrates a preferred embodiment assembly 10 comprising a display 11 and support 12. The display may be an LED or any display which provides a viewing of letters or pictures. Associated with the display is a character generator and scrolling device (not shown) which operate in a well known manner.

Figure 2:
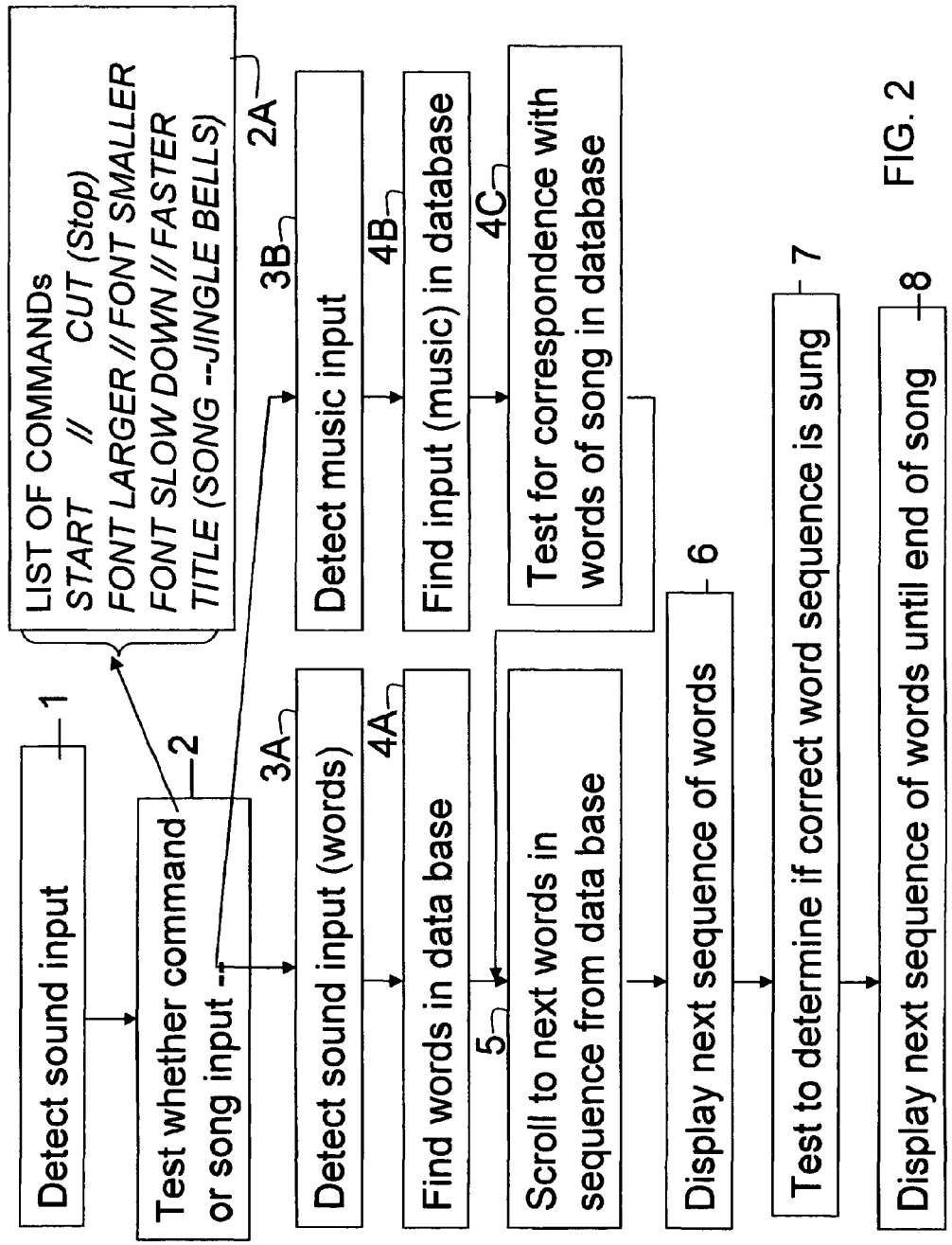
FIG. 2 illustrates a preferred embodiment subroutine flow chart of a software routine for making and using the invention.

FIG. 2 illustrates a preferred embodiment subroutine flow chart of a software routine for making and using the invention. The software may be embodied on a disk such as a CD, flashdrive, thumb drive, or the like. Sound is inputted from a microphone or the like and detected at Box 1. In Box 2, the input is tested to determine whether the input is a word from a song. Optionally, the input could be tested to detect a command, which would include, for example, start, cut (stop), and commands related to the font, such as faster, slower, title, display song titles. Optionally, commands could be distinguished from song words by using a special queuing device such as a remote control which places the receiver in a command mode, or the remote control device could include buttons which correspond to the listed commands, i.e., start, stop, font size (larger/smaller), font speed (faster/slower), and title selection. In Box 3A the song input is detected in the form of words. Optionally, the words could be placed in the memory by the current singer. This would make pattern matching easier. Optionally, the music can be detected as shown in Box 3B wherein the music being currently played is inputted in order to drive the scrolling mechanism; i.e. select the next words for scrolling. In Box 4B, the music is inputted into the database for comparison with storage music songs. The songs can be inputted into the database by the currently playing accompanying musicians or the music can be inputted by similar bands or combos and placed in memory and inputted into the device 10 upon manufacture. If the music for the song corresponds to the words being inputted, then the words appearing in the scrolling device will be essentially confirmed for sequential display. In Box 5, the scrolling function displays the next sequence of words from the database, as shown in Box 6. Optionally, in Box 7, the words being sung by the singer are matched to determine if the correct sequence has been sung, which drives the display of the next sequence of words until the song is finished as shown in Box 8.

Figure 3:
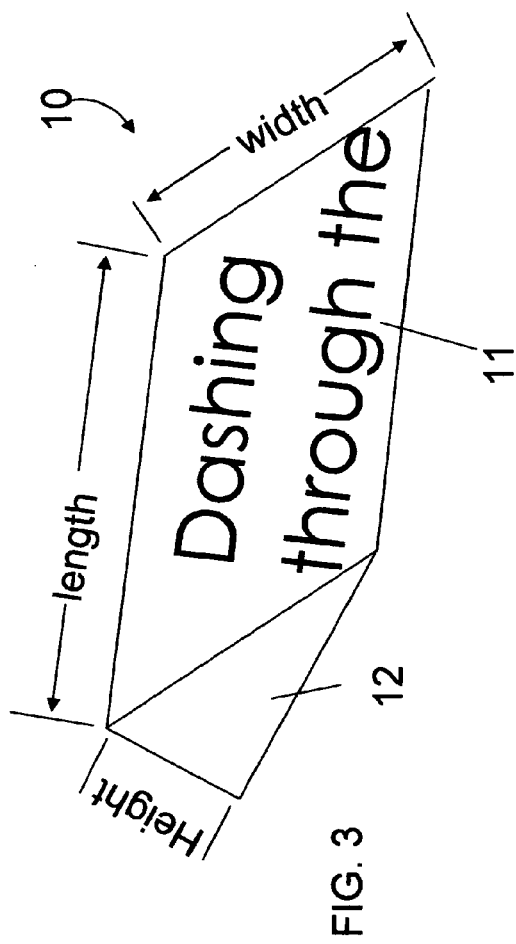
FIG. 3 is an illustration showing the variance of font size for display.

FIG. 3 is an illustration of the display of enlarged font in order to enable easier viewing. Optionally the size of display could be increased. However, an aspect of the present invention is to create a screen or display which is concealed from the audience in order that the audience is led to believe that the singer is singing without any prompts. For example, the display may be concealed on the floor of the stage or hidden behind a decoration. An aspect of the present invention is that the assembly 10 is portable and easily maneuvered and placed as desired. Moreover, the length of the display is on the order of approximately four inches to three feet, preferably approximately 6-12 inches. The width (as shown in FIG. 3) is approximately 2 to 24 inches and preferably 3-6 inches. The height of the support 12 may be on the order of zero to six inches, and may be adjustable by using adjustable supports.

Figure 4:
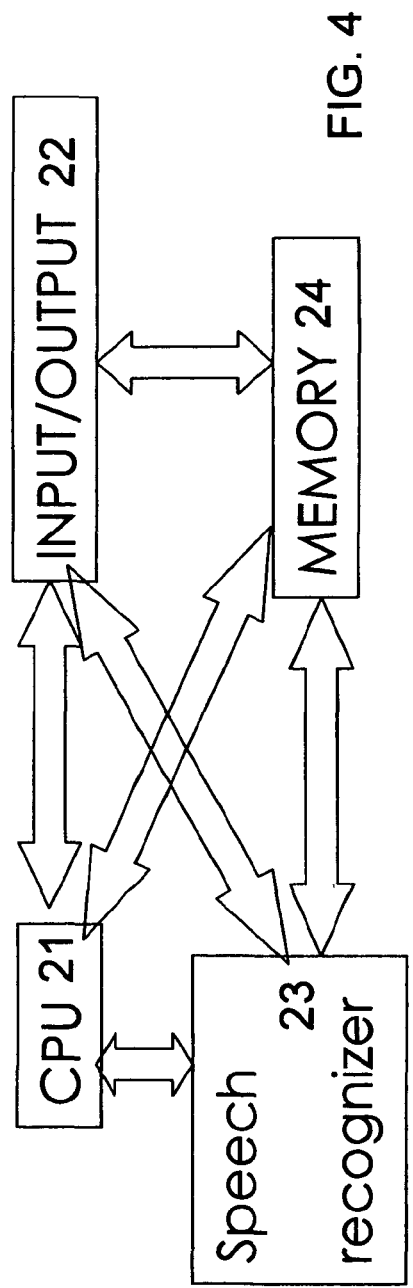
FIG. 4 illustrates an alternate embodiment in which the assembly 10A is substantially flattened so as to appear substantially level with the floor.

FIG. 4 illustrates an alternate embodiment in which the assembly 10A is substantially flattened so as to appear substantially level with the floor. This may be accomplished by using a substantially thin screen. In this embodiment, the electronics and central processing unit (or processor) may be housed behind the screen or may be located in a housing distinct from the screen and connected either by transmitter/receiver such as blue tooth or cable.

Figure 5:
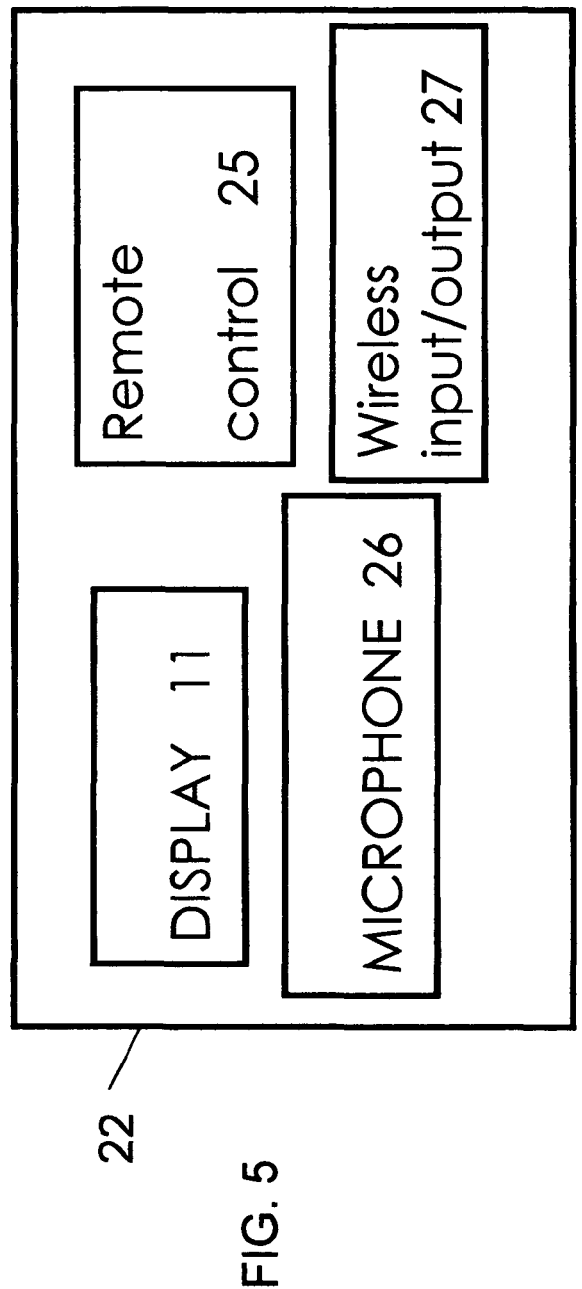
FIG. 5 illustrates an overall system block diagram of a preferred embodiment of the present invention.

FIG. 5 illustrates an overall block diagram of a preferred embodiment of the present invention. CPU 21 may be a central processing unit, computer, processor, microprocessor, multi-processor, processor and coprocessor, or the like. A speech recognizer is operatively connected to the CPU 21 which recognizes the words of a song in a manner well known to those of ordinary skill in the art. The input/output devices 22 are operatively connected to the CPU 21 and speech recognizer 23 as shown in FIG. 5. Operatively connected to the CPU 21, I/O 22 and speech recognizer is a memory subassembly 24.

Figure 6:
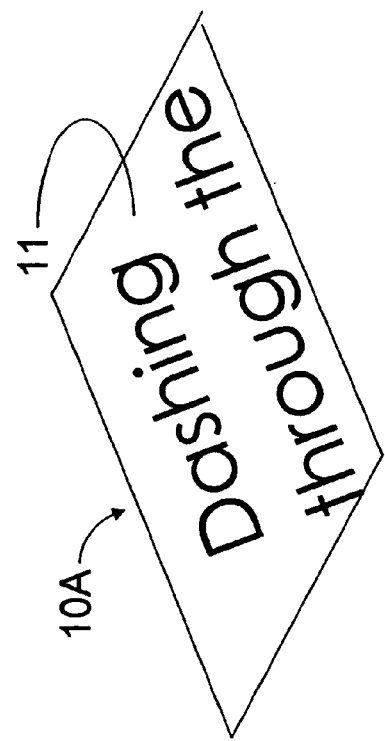
FIG. 6 illustrates a partial block diagram of the Input/output subassembly 22 which further comprises a display 11, microphone 26, optional remote control 25 and optional wireless input/output 27.

FIG. 6 illustrates a partial block diagram of the Input/output subassembly 22 which further comprises a display 11 and microphone 26. It can be appreciated by those of skill in the art that various I/O devices may be included including optional blue tooth communication devices, remote controls, etc.

Figure 7:
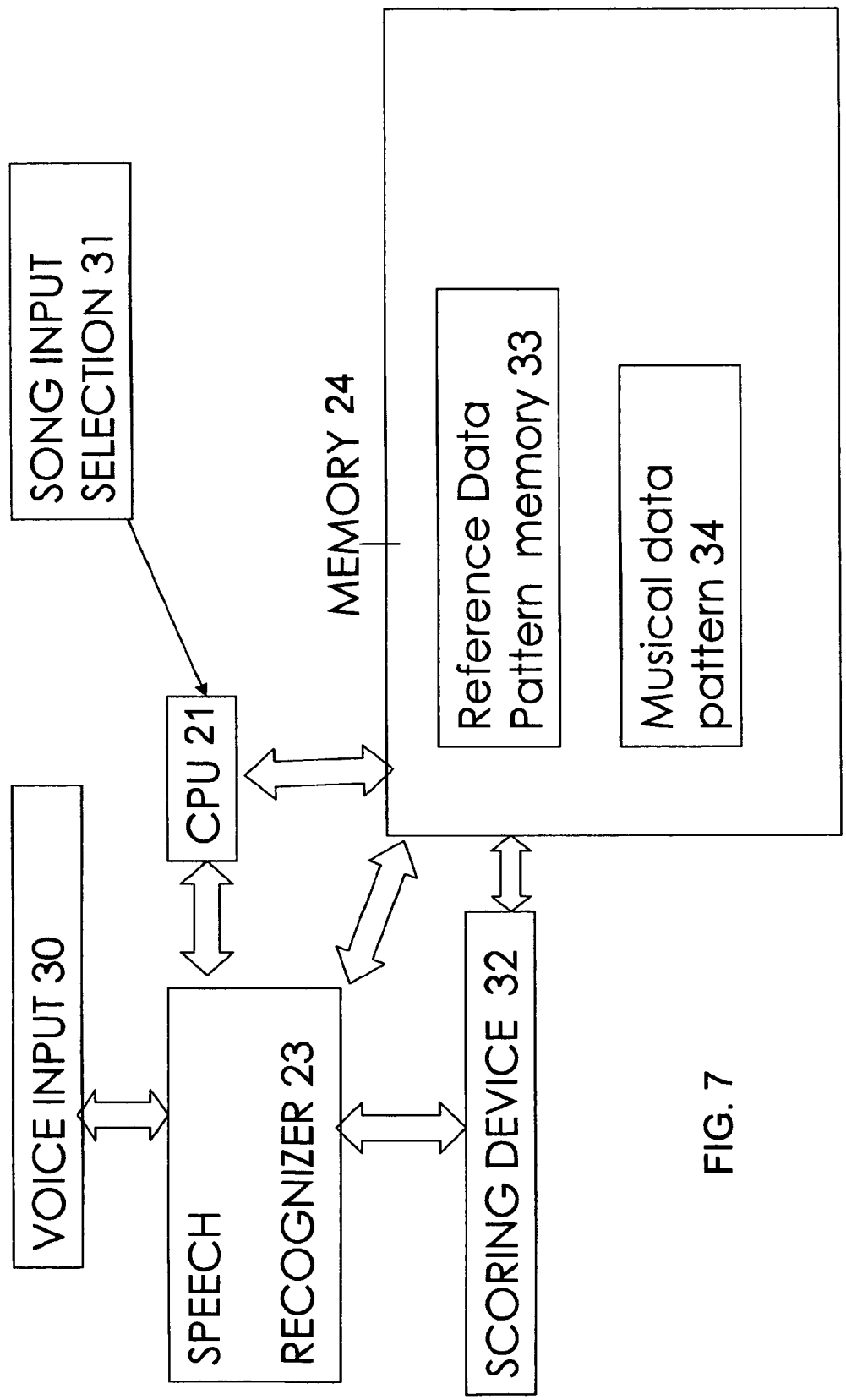
FIG. 7 is a diagrammatic illustration of a preferred embodiment of the present invention comprising a CPU 21, memory 24, song selection input 31, speech/voice recognition element 23, scoring device 32 and voice input 30.

FIG. 7 is a diagrammatic illustration of a preferred embodiment of the present invention comprising a CPU 21 and memory 24. It should be appreciated that like reference numbers represent corresponding elements, including possible substitutions. Box 30 represents the singer's voice input element which may be a microphone or the like. Box 31 represents the input of the song selection. As reference in the foregoing, the song may be inputted by saying the name of the song into the input device 30 or may be inputted through a remote control device or keyboard device. Optionally, the singer may have a song selection of 10 to 100 songs and the song could be inputted by inputting the number of the song. Optionally, a scoring device may be used in conjunction with matching the words being recognized by the speech recognizer, the pattern of words from the memory, as represented by the reference data pattern memory 33 and the musical data pattern memory as represented by Box 34.

Figure 8:
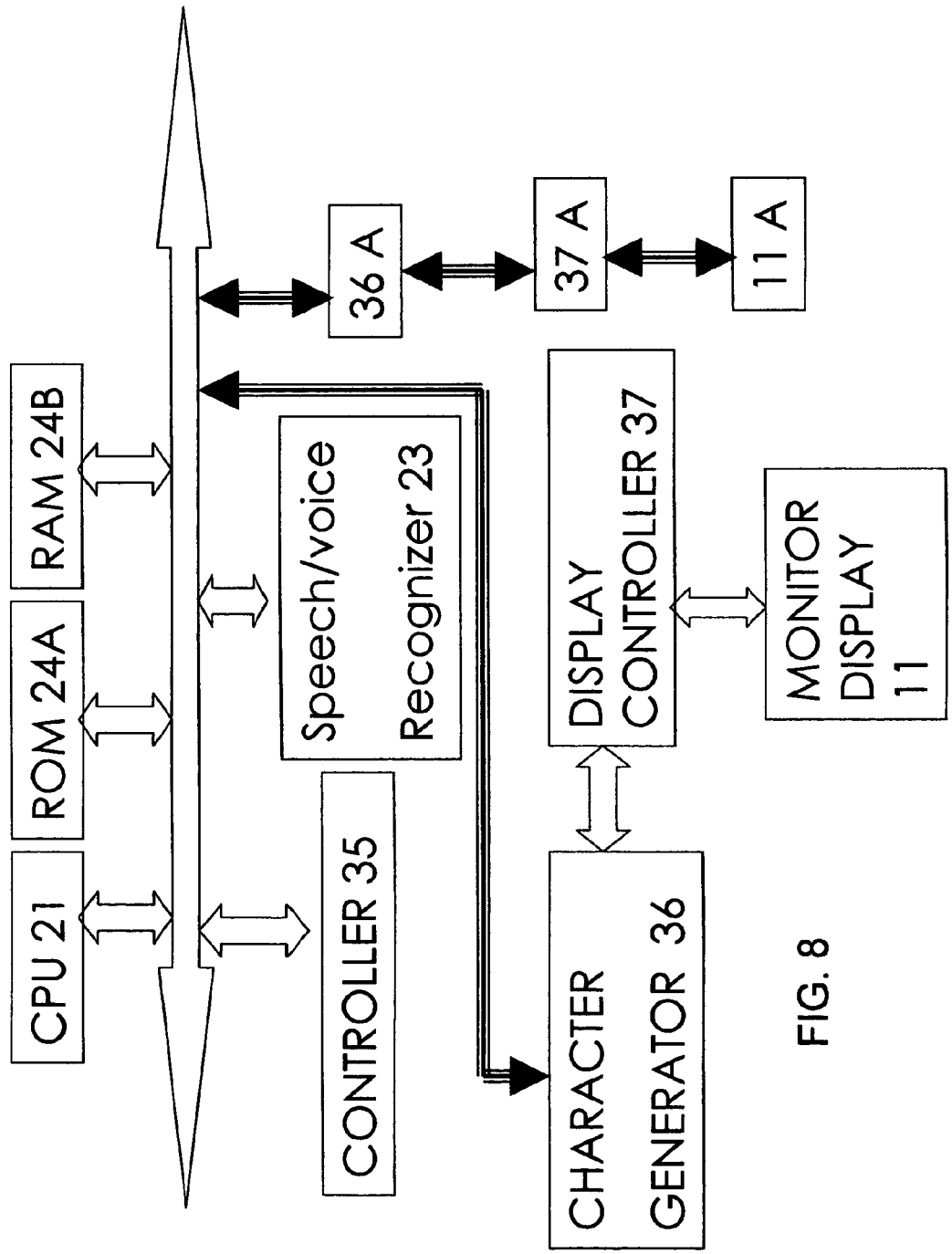
FIG. 8 is an overall system block diagram of an alternate preferred embodiment comprising multiple display elements 11, 11A and related components.

FIG. 8 is an alternate preferred embodiment comprising a CPU 21, ROM 24A, RAM 24B, voice/speech analyzer 23, controller 35, character generator 36, display controller 37 and display/monitor 38. The display controller 37 operative to perform the scrolling function where characters from the character generator 36 are scrolled for display on the monitor 38 in a manner well known in the art. Optionally, in the case of a duet, trio, quartet, or multi-person group, the words of the song for the accompanying singer may be displayed. The accompaniment may be in a different font or different color font. Also depicted in FIG. 8 are the character generator 36A, display controller 37A and display 11A, which represent the hardware for an accompanying singer or artist. In the interest of avoiding duplicity, only a single set of character generator 36A, display controller 37A and display 11A are shown. However, multiple accompanying artists can be included. Each display may show only the words or music for the accompanying artist, or, optionally, may include some or all of the script for the accompanying artists.

It can be appreciated that when the present invention is used in conjunction with the performance of a play, then the music component may be eliminated and the scrolling will be based upon the spoken words of the respective actors.

Figure 9:
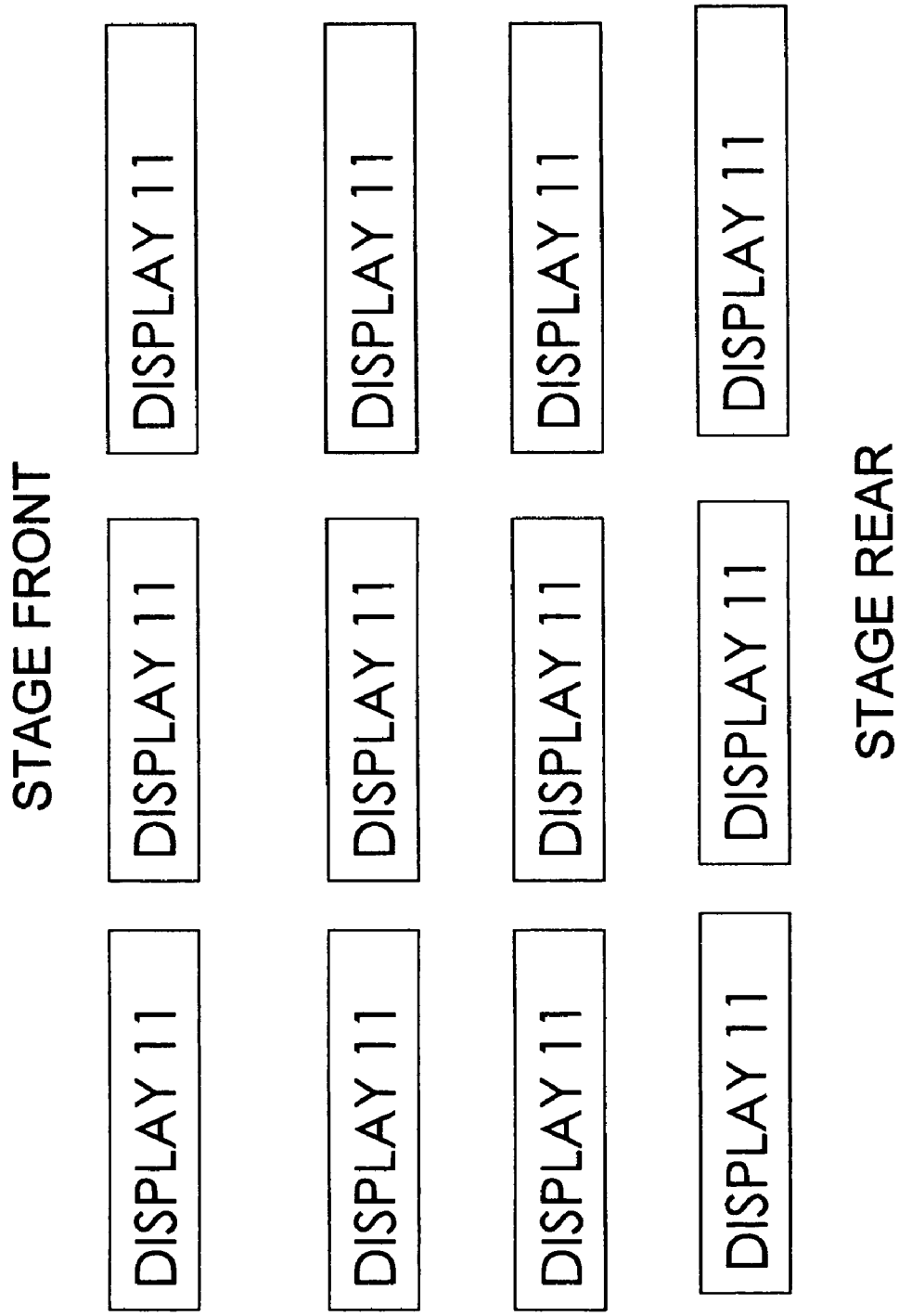
FIG. 9 illustrates an alternate embodiment in which multiple displays 11 may be placed on and/or embedded in the floor on either a temporary or permanent basis.
Figure 9A:
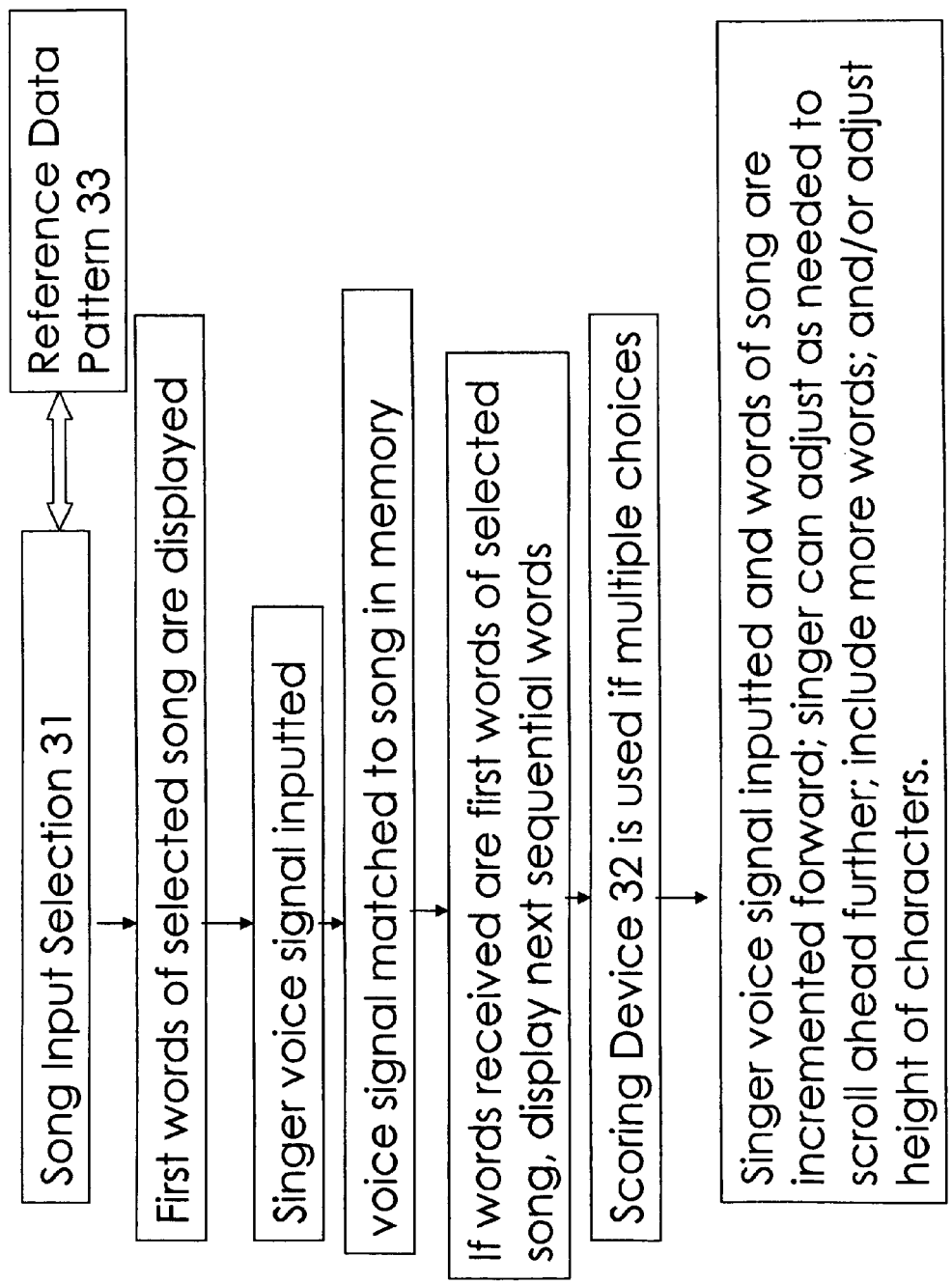
FIG. 9A is a partial flow chart of a subroutine portion of a preferred embodiment.

As shown in FIG. 9, in the case of a stage upon which actors or artists are presenting a performance, displays 11 may be placed on and/or embedded in the floor on either a temporary or somewhat permanent basis. As the actor or artist sings or moves about the floor, the display of words is timed such that the actor/artist will view the words that he or she is to say or sing on the respective display as he is located in the respective area near the respective one of the displays 11. Although the displays 11 are depicted in the floor of the stage or performance area, they may be placed behind props, on or behind furniture, walls, or any suitable place for viewing where an actor or singer may be expected to be for viewing. A central person or director may determine what words will be displayed at which locations at any point in time. For this reason a control center, similar to that at a football game, may be used having a corresponding number of displays for selection of the appropriate display for the actor or singer to view at the appropriate time.

Figure 10:
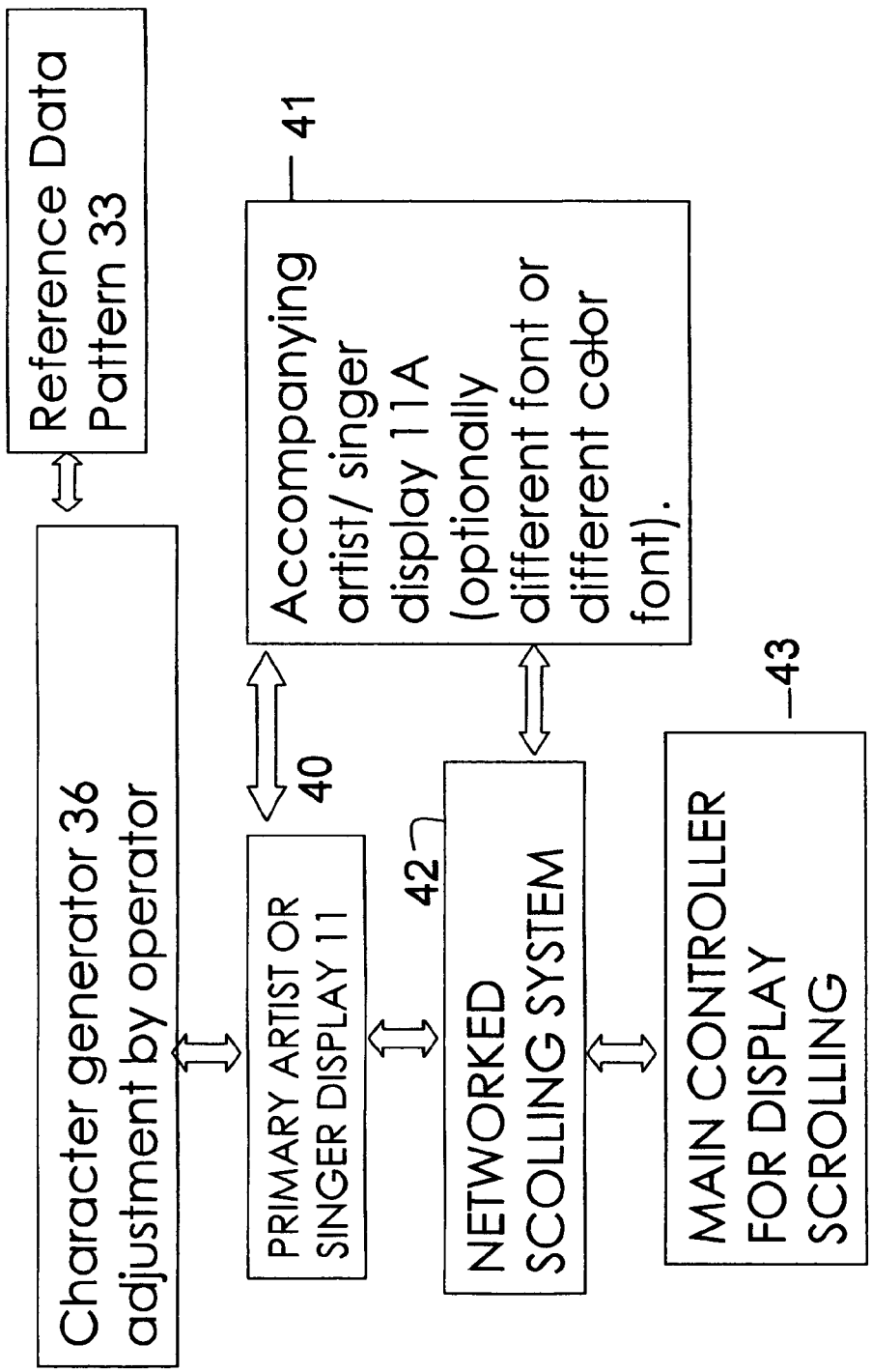
FIG. 10 is depiction of subroutine elements of a preferred embodiment of the present invention, including optional networking.

FIG. 10 is depiction of subroutine elements of a preferred embodiment of the present invention. The character generator 36 provides for font adjustment; number of words being displayed and scroll ahead. Alternatively, adjustment may be made by a remote control operated by singer. In the case of a networked scrolling system, the accompanying musicians or actors may each have an individual display that may be keyed off the main or lead singer. Optionally, each of the musicians or actors may select whose patterns they may view and may also adjust the scroll ahead feature and character size. Shown in FIG. 10 is a main controller 43 which may be computer controlled with or without an operator. The main controller adjusts the displaying of the material on the screens in accordance with the location of the screen at the time of the display. For example, an operator viewing a play may control the displays such that the as the actor approaches a respective display screen he views the lines he must recite at that particular instant in time.

Figure 11:
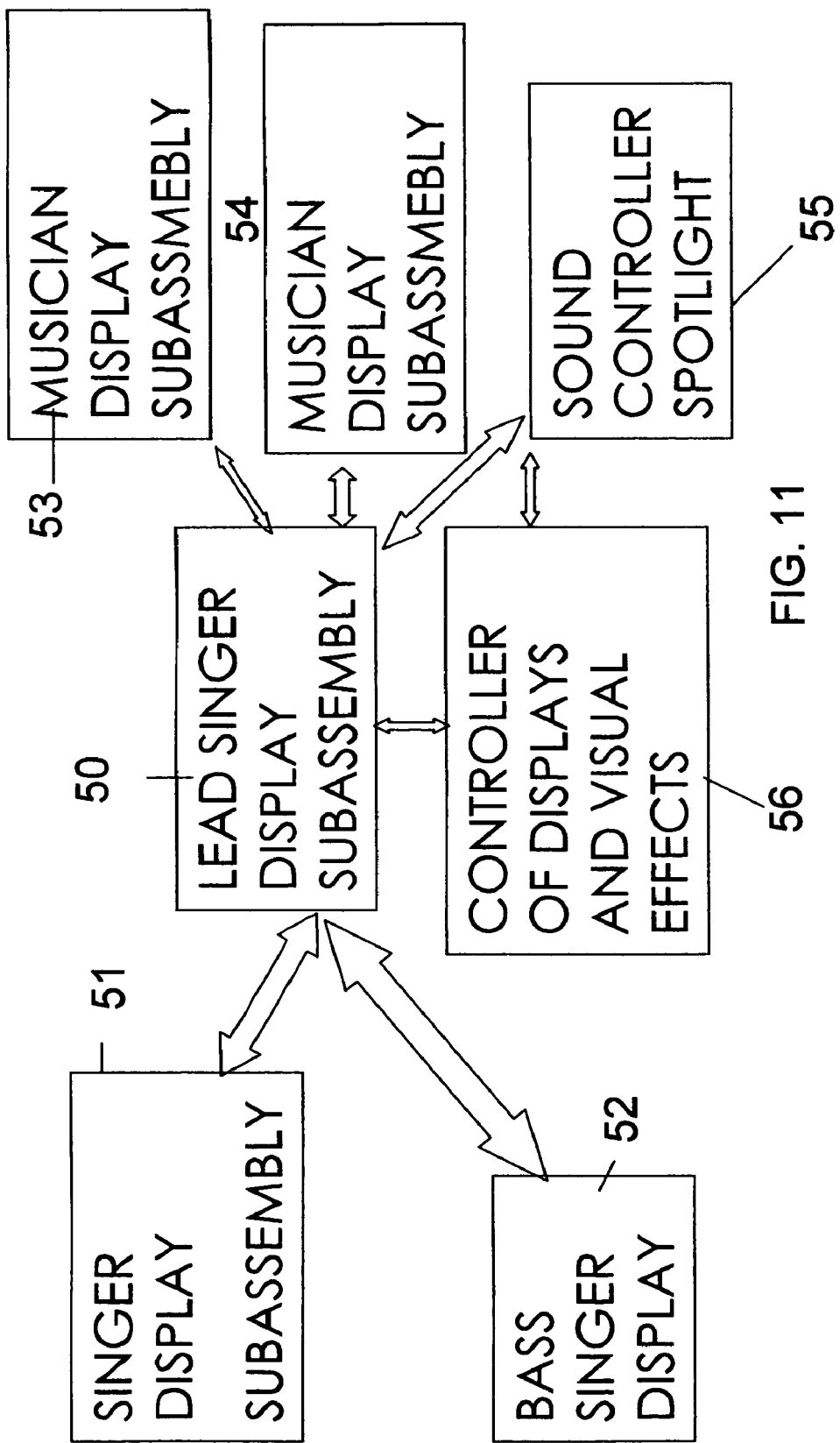
FIG. 11 illustrates an alternate preferred embodiment representing a musical performance.

FIG. 11 illustrates an alternate preferred embodiment representing a musical performance. In the case of a networked scrolling system, the accompanying musicians may be keyed off the main or lead singer. Optionally, the musicians may select whose patterns they may view and may also adjust the scroll ahead feature and character size. When the other singer is singing, the scrolling will key from the music being sung.

As represented in FIG. 11, a lead singer display subassembly is operatively connected to a singer display subassembly 51, a bass singer subassembly 52, a musician display subassembly 53, a second musician display subassembly 54, a sound and spotlight controller 55 and a display controller and controller of visual effects 56. It can be readily appreciated that the interconnections provide for control of the scrolling features of the present invention by either controller 56 or interactive control by one of the singer display subassemblies, such as the lead singer subassembly. Each subassembly 51, 52, 53, and 54 may comprise the character generator 36, display controller 37 and display 11 shown in FIG. 8. Each subassembly may be operatively connected to a main bus 10BUS, controller 35, CPU 21, speech voice recognizer 23, and memory 24A, 24B, as shown in FIG. 8.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Embodiments of the present invention are described herein are schematic illustrations of idealized embodiments of the present invention. As such, variations from the shapes of the illustrations as a result, for example, of manufacturing techniques and/or tolerances, are to be expected. The embodiments of the present invention should not be construed as limited to the particular shapes of displays illustrated herein but are to include deviations in shapes that result, for example, from manufacturing. The regions (or display areas) illustrated in the figures are schematic in nature and their shapes are not intended to illustrate the precise shape of a region and are not intended to limit the scope of the present invention.

The terminology controller as used herein may be a microprocessor, computer, programmable controller, programmable chip, processor or the like.

As used herein the word "text" means a song, document, play or script, or writing comprising words.

As used herein the terminology "vocal input" or "vocal input signal" means the words from a performer, singer, actor, or operator that are received by the audio input device, which may be, for example, a microphone.

The terminology "speech recognizer" or "voice recognizer" as used herein means an apparatus for converting a vocal input into machine readable input. Likewise, speech analyzer or voice analyzer are equivalent to speech recognizer and voice recognizer. The speech recognizer may use computer speech recognition, and operates to convert spoken words to machine-readable input, as for example a binary code for a string of character codes. The term "voice recognizer" or "speech recognizer" includes but is not limited to speech recognition where the recognition system is trained to a particular speaker. As used herein "speech recognition" or "voice recognition" is a broad term which means it can recognize any person's speech and can recognize a variety of voices. Voice recognition or "voice recognizer" is not limited to a particular user, where it recognizes their speech based on their unique vocal sound, unless specifically stated.

Although a few exemplary embodiments of the present invention have been shown and described, it would be appreciated by those skilled in the art that changes may be made in these embodiments, without departing from the principles and spirit of the invention, the scope of which is defined in the claims and their equivalents.

The invention claimed is:

1. An interactive assembly for displaying a sequence of words from a song comprising:
   a processor;
   at least one memory operatively connected to the processor; the at least one memory containing words from songs and commands;
   at least one speech recognizer operatively connected to the processor for converting vocal input into input readable by the processor; the recognition of speech being limited to the vocal input of a particular user;
   at least one audio input operatively connected to the speech recognizer for receiving vocal input; the processor operating to determine whether the vocal input comprises a command or word from a song in memory;
   at least one display operatively connected to the speech recognizer for displaying words of a song based upon the output of the speech recognizer; the processor operating to control the display of words based upon inputted audio commands;
   whereby based upon the vocal input, the next words to be recited are incrementally displayed onto the at least one display contemporaneously with the vocal input received from the operator or, if the vocal input is a command, the processor will respond to the command to thereby regulate the display of words.

2. The assembly of claim 1 further comprising a display which only displays words numbering in the range of one to ten words and wherein the size of each of the words being displayed is controlled using vocal commands.

3. The assembly of claim 1 wherein by utilizing the vocal commands the operator can adjust the display of words to include more words and/or adjust the height of characters.

4. The assembly of claim 1 wherein the inputted vocal commands include commands which start the display of words, stop the display of words, increase the speed of words being displayed, decrease the speed of words being displayed, and select the song to be displayed.

5. The assembly of claim 1 wherein the at least one memory comprises a memory containing songs, and wherein when music is inputted into the audio input, the processor operates to compare the vocal input with the songs in memory and upon finding a match, displays the words of the song onto the at least one display and wherein the operator may shorten the song and skip ahead by changing words to be sung to those later in the song whereupon the processor will recognize those as being later in the song and automatically skip to that section of the song, and the display will automatically skip to the proper segment of the song.

6. The assembly of claim 1 wherein the assembly is adapted to be placed upon the floor of a stage so as to be substantially concealed from the audience and wherein the assembly is portable and self contained with a length in the range of approximately four inches to three feet, a width of approximately 3 to 6 inches and a height of approximately six inches or less.

7. The assembly of claim 1 wherein the assembly is a single unified structure having a single display comprising an LED which displays letters in the range of 2 to 4 inches in height.

8. An interactive assembly for displaying a sequence of words comprising:
   a processor;
   at least one memory operatively connected to the processor;
   at least one speech recognizer operatively connected to the processor for converting speech into input readable by the processor;
   at least one audio input operatively connected to the speech recognizer;
   at least one display operatively connected to the processor for displaying words based upon the output of the speech recognizer;
   the speech recognizer operative to contemporaneously receive both words to be displayed and vocal commands for controlling the display of words, the processor operating to discriminate between vocal commands and words to be displayed and convert vocal commands into control signals which control the size of the font on the at least one display and/or the speed at which the font is displayed on the screen while the sequence of words is being incrementally displayed onto the display,
   such that if the received vocal input is a displayed word, the next words to be recited are incrementally displayed onto the at least one display contemporaneously with the input received from the user—and if the received vocal input is a command, the size of font or speed of the display of words is changed in accordance with the command.

9. The assembly of claim 8 further comprising a plurality of displays screens for a plurality of users comprising a lead user, and a controller, the controller operating to determine which of the plurality of displays will have the words displayed at a point in time, the controller operating to display the words to be viewed by an associated user on a predetermined display; all of the displays being controlled by the vocal input of the lead user, and each of the displays being individually controllable by the associated user such that the associated user can control the size of the font.

10. The interactive assembly of claim 8 wherein the sequence of words displayed are words to a song and as the users sings the words of the song, the words of the song are incrementally displayed, and if the user voices a command, the processor reacts to the command to stop the display, select the song to be displayed, change the speed of the words being displayed, or change the font size.

11. The assembly of claim 8 wherein the assembly is a portable, single, unified, self-contained structure having a single display comprising an LED and wherein the assembly has a length in the range of approximately four inches to three feet and wherein the sequence of words have letters that can be varied in size from 2 to 4 inches in height.

12. A method for interactively displaying the words of a text sequentially on a display comprising:
   receiving an inputted vocal input from a particular user in an audio input device;
   inputting the inputted vocal input into a speech recognizer operatively connected to at least one processor; the recognition of speech being limited to the vocal input of a particular user;
   comparing the inputted vocal input with words stored in sequence in memory using the processor to determine whether the vocal input comprises words stored in sequence in memory or a command to regulate the display of words;
   if the vocal input comprises words stored in sequence in memory, then outputting on a display only the next sequential words for display to the person inputting the vocal input;
   if the vocal input comprises a command, then enabling the processor to execute the command to thereby regulate the display of words;
   whereby based upon a word or words received by the audio input, the next words to be recited are incrementally displayed onto the at least one display contemporaneously with the received vocal input or if a command is received by the audio input, the display of words is changed in accordance with the command.

13. The method of claim 12 wherein there are a plurality of displays to accommodate a plurality of performers who are vocally inputting words into the audio input device; each display being responsive to the vocal input of a particular performer; and the displays are displaying the appropriate words to be recited by the performers, each of the displays being adapted for viewing by one of the performers.

14. The method of claim 12 wherein there are a plurality of displays interconnected by a network and a controller is connected to the network, the controller operating to display the words to be viewed by a predetermined performer on a predetermined display; each of the displays being centrally controlled by the vocal input of one particular user.

15. The method of claim 12 wherein there are a plurality of displays, each displaying different information to be recited by a performer, and wherein the information to be displayed for viewing by a respective performer is based upon the vocal input received by the audio input device from a predetermined one of the performers.

16. An interactive prompt device for displaying the words of a song as it is being sung comprising:
   at least one processor; the at least one processor being responsive to commands for changing the display of words;
   at least one memory operatively connected to the at least one processor for storage of at least one song;
   at least one display for displaying words of a song; each of the words being of a height in the range of 1-8 inches in height;
   a speech recognizer operatively connected to the at least one processor; the recognition of speech being limited to the vocal input of the singer; the voice of the singer being inputted into the speech recognizer; the speech recognizer operating to recognize the words of the song as it is being sung by the singer and display only the next 2-6 words of the song in sequential fashion; the speech recognizer operating to recognize vocal commands inputted by the singer; the at least one processor operating to change the display of words in response to a command;
   whereby the at least one display acts as a prompt for viewing by a singer as the song is being sung, the letters of the words of the song being visible to the singer yet concealed from the audience.

17. The device of claim 16 wherein the commands comprise commands which start the display of words, stop the display of words, increase the speed of words being displayed, decrease the speed of words being displayed, and select the song to be displayed.

18. The device of claim 16 wherein the display displays letters in the range of 2 to 4 inches in height and the display displays only 2 to 4 words at a time, including the next sequential word of the song that is being sung by the singer.

19. The device of claim 16 wherein the at least one display comprises a plurality of displays interconnected into a network and wherein each of the displays is responsive only to the voice of a particular singer.

20. The device of claim 19 wherein the network is controlled by a central controller, the controller operating to determine which of the plurality of displays will have the words displayed at a point in time.

21. The device of claim 16 wherein the at least one display comprises a plurality of displays, each displaying different information to be recited by a respective singer, and wherein the information to be displayed for viewing by a respective singer is based upon the vocal input received by the audio input device from a predetermined singer.

22. The device of claim 16 wherein the assembly is a portable, single, unified, self-contained structure having triangular sides and a single display comprising an LED and wherein the assembly has a length in the range of approximately four inches to three feet, a width of approximately 3 to 6 inches and a height of approximately six inches or less.

* * * * *